United States Patent Office 3,457,324
Patented July 22, 1969

3,457,324
THERMOSETTING COATING COMPOSITIONS COMPRISING HYDROXY-FUNCTIONAL INTERPOLYMERS
Kazys Sekmakas, Chicago, Ill., assignor to De Soto, Inc., a corporation of Delaware
No Drawing. Filed June 10, 1966, Ser. No. 556,549
Int. Cl. C08g 22/16, 51/72
U.S. Cl. 260—834                 17 Claims

ABSTRACT OF THE DISCLOSURE

Resins having the properties of acrylic or vinyl-based interpolymers are provided by combining from 3-25%, preferably 5-15%, by weight of hydroxy-functional polyesters or polyurethanes with from 2-20% by weight of non-nitrogenous hydroxy-functional monomer such as hydroxy ethyl acrylate, and with the balance of the copolymer being monoethylenic monomer substantially devoid of material reactive with the hydroxy group. By having the polyester or polyurethane on the one hand, and the hydroxy monomer on the other hand, each providing at least 15% of the total hydroxy functionality, and by minimizing the polyester or polyurethane content, the essential vinyl or acrylic character is maintained and the interpolymer cures to exceptional fabrication resistance.

The present invention relates to thermosetting coating compositions comprising hydroxy-functional interpolymers which include a monomeric and a resinous source of the hydroxy group in order to provide solvent-soluble interpolymers or copolymers which are useful in thermosetting organic solvent solution coating compositions in admixture with organic solvent-soluble, heat-hardening aminoplast resins.

In recent years, the provision of thermosetting interpolymers has taken on considerable importance and numerous efforts have been made in order to provide highly soluble interpolymers which include reactive groups so that the final resin properties can be built up after the resin is deposited in film form and subjected to elevated temperature baking in order to cause the resin to undergo a curing reaction to form an adherent film having good properties. Numerous efforts have been made to employ the hydroxy group, in one form or another, but it has been difficult to combine divergent desired properties in a single hydroxy functional interpolymer, especially from the standpoint of providing thermosettable materials which will cure to provide films of adequate flexibility.

Referring more particularly to the prior art, interpolymers have been formed to include acrylamide or an alkylolated acrylamide but these normally form films which are harder and less flexible than those which are contemplated in the invention. In an effort to maximize the normally antagonistic properties of hardness and flexibility, I have previously disclosed the incorporation in the alkylolated acrylamide interpolymer of hydroxy-functional polyethylenically unsaturated polyester resins. Thus, in my prior U.S. Patent No. 3,163,615 dated Dec. 29, 1964, the polyester adds flexibility with minimum sacrifice in hardness, but the methylol group provided by the alkylolation of the acrylamide is highly reactive with the hydroxy group of the polyester and the tendency is to form films which are harder and less flexible than is preferred herein. Similarly, and in my copending application Ser. No. 271,603, filed Apr. 19, 1963, now U.S. Patent No. 3,368,988, granted Feb. 13, 1968, I have disclosed the incorporation in the alkylolated acrylamide interpolymer of hydroxy-functional polyethylenically unsaturated polyurethane resins in order to combine superior flexibility and adhesion with minimum sacrifice in hardness. Again, the presence of the acrylamide-carried methylol group in combination with the polyurethane hydroxy group provides a tendency to form films which are harder and less flexible than is preferred herein.

It is always possible to omit the methylolated acrylamide component of the interpolymer and rely entirely upon the hydroxy functionality of the polyethylenically unsaturated resin. While this might provide the flexibility needed, for example in a coil coating, it is not possible to rely entirely upon the hydroxy functionality of the resinous component since, if sufficient hydroxy-functional resin is used to provide an adequate cross-link density, then the interpolymer would not contain sufficient monoethylenically unsaturated monomer, e.g., vinyl or acrylic monomer, to provide good properties. On the other hand, one can employ a monoethylenically unsaturated hydroxy monomer such as hydroxy ethyl acrylate or methacrylate to provide the hydroxy functionality needed in the interpolymer. When such hydroxy monomers are used to provide adequate cross-link density in the absence of the hydroxy-functional resinous component, the interpolymer lacks the desired flexibility.

In accordance with the present invention, it has been found that a three component interpolymer provides an opportunity for simultaneously providing the good properties normally associated with acrylic or vinyl-based interpolymers together with sufficient cross-link density for good cure and sufficient flexibility to withstand severe impact and fabrication as is required for coatings to be used on metal sheets which are coated while flat and later deformed for use, e.g., coil coating.

The three essential components of the interpolymer and the proportion of their use are:

(A) Polyethylenically unsaturated hydroxy-functional condensation resin;

(B) Non-nitrogenous aliphatic monoethylenically unsaturated hydroxy-functional monomer; and (C) Monoethylenically unsaturated monomer substantially devoid of material reactive with the hydroxy group. These components are more fully described in the materials which follow.

The first essential component is a polyethylenically unsaturated hydroxy-functional condensation resin which may be a polyester or a polyurethane resin. Referring first to the polyester, the unsaturation required to permit interpolymerization can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as allyl alcohol, methallyl alcohol or crotyl alcohol. Unsaturated monocarboxylic acids are illustrated by crotonic acid and by fatty acids containing conjugated unsaturation such as eleostearic acid, licanic acid or dehydrated castor oil fatty acids, this conjugated unsaturation providing reactive double bonds to enable copolymerization with acrylamide and the other monoethylenically unsaturated monomers which are copolymerized. Incorporation of monocarboxylic acids is facilitated by the use of glycerine in the production of the polyester. When the glycerine polyester is preformed, the monoacid reacts with the secondary hydroxyl group of the glycerine residue, but, as is known, the polybasic acid, the glycerine and the monoacid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha-beta unsaturation, (2) beta-gamma unsaturation, or (3) conjugated unsaturation. When the unsaturation is in a chain not a part of the linear polyester backbone, the danger of gelation on polymerization is reduced, but the use of unsaturated dicarboxylic acids such as maleic, fumaric or itaconic acids can be carried out relatively easily in the thermoplastic resin environment and is preferred.

Broadly, the unsaturated polyester resin should contain about 0.005 to 0.40 gram mol of ethylenically unsaturated component per 100 grams of polyester. Of course, the precise preferred proportion of unsaturation will vary depending on the reactivity of the unsaturated component (maleic acid is more reactive than crotonic acid). Moreover, practical aspects of processing must be kept in mind since, with less unsaturation, one may copolymerize for longer periods of time and/or under more vigorous conditions. With more unsaturation, there is a tendency to gel, especially with more reactive materials such as maleic anhydride or acid. However, one can terminate the reaction before gelation, especially when the reaction is carefully supervised or effected under mild conditions. Preferably, and when using polyesters containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.03–0.3 gram mol of unsaturated component per 100 grams of polyester.

The hydroxy functional polyester resin should have an hydroxy functionality indicated by an hydroxyl number of from 10–300, preferably from 10–150 (milligrams of KOH to saponify 1 gram of resin).

The hydroxy-functional unsaturated polyester is used in an amount of from 3–25% by weight, based on the weight of the interpolymer. Preferred proportions are from 5–15%. When less unsaturated polyester is used, the films which are formed are insufficiently flexible. When larger proportions of unsaturated polyester are used, then the proportion of monoethylenically unsaturated monomer must be unduly reduced and the product loses its essential vinyl or acrylic character.

While the molecular weight of the unsaturated polyester is of secondary significance so long as the polyester is not gelled, it is desirable to employ polyesters which have a viscosity in n-butanol at 80% solids in the range of from C to Z-6, preferably in the range of from D to W measured on the Gardner-Holdt scale at 25° C.

The proportion of oil which is incorporated in the polyester is of secondary significance in the invention. Indeed, oil may be entirely omitted. However, it is preferred to have a proportion of oil present. Thus, the polyester may include various proportions of oil such as: (1) short oil (20–30% by weight of oil); (2) medium oil (30–60% by weight of oil); and (3) long oil (60–70% by weight of oil). Short oil polyesters are preferred.

The unsaturated polyurethane resin which may be used in the invention either alone or in admixture with the polyester resin discussed hereinbefore, is also a resinous, hydroxy-terminated, polyethylenically unsaturated material. In the production of such polyurethanes, hydroxy-functional material is used in a stoichiometric excess substantially eliminating isocyanate reactivity from the product. Moreover, any residual isocyanate reactivity would be destroyed by reaction with alcohol solvent frequently used in the solution polymerization. The same weight proportions applicable to the use of polyester resin in the invention are equally applicable to the polyurethane resins under consideration.

Various organic polyisocyanates may be used in the present invention, without limitation. So many organic polyisocyanates are known as a class to be useful for polyurethane production and all are useful herein so that no effort will be made to list these known materials. Instead, it is simply stated that organic diisocyanates are preferred and the invention will be illustrated using the commercial toluene diisocyanate (mixed isomers) which is well known to be typical of the entire class of useful materials and which is preferred for its low cost. On the other hand, aliphatic polyisocyanates are preferred for their superior color retention quality.

Unsaturation may be introduced by the presence of any ethylenically unsaturated monomer including one or more functional groups reactive with the isocyanate group. However, it is preferred to employ ethylenically unsaturated monomers having one or more hydroxy groups as the sole functional group present. These are illustrated by trimethylol propane diallyl ether, glycerol monoallyl ether, 2-hydroxy methyl-5-norbornene, allyl alcohol, crotyl alcohol, glycerol monoacrylate, etc. Monoethylenically unsaturated polyhydric compounds are particularly preferred, and the invention will be illustrated using trimethylol propane monoallyl ether which, in present knowledge, is particularly preferred.

Preferred polyurethanes useful in the invention include a proportion of aliphatic saturated diol and a proportion of aliphatic saturated polyhydric alcohol containing at least 3 hydroxy groups. Either or both of these categories are desirably filled by a polyether.

Diols which may be used include ethylene glycol, propylene glycol and butylene glycol, but higher molecular weight ether glycols are preferred such as polyethylene glycol, polypropylene glycol and polybutylene glycol. Broadly, polyethers having a molecuar weight of from 300 to about 7000 may be used, the invention being well illustarted by a commercial polypropylene glycol having an average molecular weight of 1025.

Polyhydric alcohols which may be used are illustrated by glycerin, pentaerythritol, trimethylol propane, hexanetriol, and the like. Polyethers of polyhydric alcohols are also useful such as ethylene oxide, propylene oxide, butylene oxide and styrene oxide polyethers of the polyhydric alcohols noted above as well as of inorganic hydroxy compounds such as phosphoric acid.

Preferably, at least 10%, and more preferably, at least 20% of the total weight of the hydroxy component of the polyurethane is a polyether. Particularly preferred polyethers for use in the invention are propylene oxide addition products with hydroxy compounds containing two or more hydroxy groups and having a molecular weight of from 400 to 5000.

A feature of the invention is the achievement of considerable flexibility and impact resistance in cured coatings in the absence of any oil component as a result of the polyurethane linkage, especially in combination with the presence of polyethers in the polyurethane. For best results, it is desirable to produce a polyurethane in which the unsaturated groups are uniformly distributed and in which polyhydric alcohol containing at least three hydroxy groups is used to build chain length since this, and especially when molecular weight is limited as indicated hereinafter, helps to reduce the precipitation of polymer fragments during polymerization. For this purpose, a two-stage reaction is employed in which the polyhydric monounsaturated component, preferably in admixture with a saturated polyether glycol, is reacted with a large stoichiometric excess of organic polyisocyanate such as about 2 mols of polyisoyanate per mol of polyhydric component, preferably diisocyanate, to form an isocyanate-terminated intermediate which is then reacted with a polyhydric alcohol containing at least three hydroxyl groups to form a highly soluble polyurethane with many hydroxyl groups available for subsequent cure.

It is also desirable in some instances to obtain additional internal plasticization through the presence of fatty acid groups from drying, semi-drying or non-drying oils. In such instance, the objective is to relatively uniformly distribute the fatty acid groups within the polyurethane resin and to achieve this by a simple procedure using the less expensive oil, e.g., the triglyceride, as opposed to the more expensive fatty acid itself. This objective is achieved by a procedure in which the oil is mixed with the diol and polyhydric alcohol components, and the mixture subjected to alcoholysis to distribute the fatty acid groups to all of the components by transesterification. The complex mixture of partial esters so produced is then reacted with the polyisocyanate component, preferably diisocyanate, in at least 5% stoichiometric deficiency of isocyanate group, to produce a resinous polyurethane. Molecular weight is controlled by stoichiometry, as is well known, the stoichiometric balance of hydroxy groups to isocyanate group being within the range of from 1.05:1 to 2.5:1, preferably within the range of from 1.1:1 to 2.0:1. Since the unsaturated polyhydric component is also present during a portion of the alcoholysis, or preferably is added shortly prior to polyurethane formation, the unsaturated groups are also well distributed within the polyurethane product.

Normally, and with the stoichiometry indicated above, it is preferred to employ a proportion of diisocyanate corresponding to from 10-30% by weight of the polyurethane which is produced. However, and particularly when the polyurethane is obtained by the reaction of a small proportion of polyisocyanate with a large excess of hydroxy-functional polyester, the stoichiometric excess of hydroxy groups can be very much higher than has been indicated and the proportion of polyisocyanate can be very much lower, e.g., as low as about 2%, based on the weight of the polyurethane.

An important aspect of this reaction is the fact that it occurs at temperatures lower than are required for polyester production and without the separation of water.

The transesterification or alcoholysis reaction is a well-known reaction which takes place at elevated temperature, desirably in the presence of an alcoholysis catalyst. A temperature of 480° F. illustartes a preferred reaction temperature and, in the presence of calcium naphthenate alcoholysis catalyst, a one hour reaction is fully adequate. Other appropriate alcoholysis catalysts are illustrated by calcium oxide and lead oxide. The reaction with polyisocyanate is conveniently carried out at 260-270° F. until viscosity reaches a constant level.

The polyurethane resin may have the same unsaturation as the polyester resin, but it is preferred to employ an unsaturation indicated by an iodine number of from 25 to 400, preferably from 50 to 300. The iodine numbers are measured by the Wijs method which reports the number of grams of iodine absorbed by 100 grams of unsaturated material. Similarly, the polyurethane resin may possess an hydroxyl functionality indicated by an hydroxyl number of from 10-300, preferably from 10-150 (milligrams of KOH to saponify 1 gram of resin).

While the molecular weight of the polyurethane resin is of secondary significance so long as the polyurethane is not gelled and does not induce gelation during polymerization, it is desirable to employ polyurethane resins which have a viscosity in n-butanol at 80% solids in the range of from C to Z-6, preferably in the range of from D to W measured on the Gardner-Holdt scale at 25° C.

The second essential component of the interpolymer is a monomer which supplies the hydroxy group. This monomer, in the invention, is a non-nitrogenous, aliphatic, monoethylenically unsaturated hydroxy-functional monomer used in a proportion of from 2-20% by weight, preferably in an amount of from 3-15%. The preferred hydroxy functional monomers are 2-hydroxy ethyl acrylate and 2-hydroxy ethyl methacrylate, these being illustrative of the class which also includes other hydroxy alkyl acrylates and methacrylates such as 2-hydroxy propyl methacrylate, 3-hydroxy propyl methacrylate and 4-hydroxy butyl methacrylate. Still further hydroxy containing monomers which may be used are ethylene glycol allyl ether, propylene glycol allyl ether, butylene glycol allyl ether, diethylene glycol allyl ether, trimethylol propane allyl ether, glycerol allyl ether and 2-hydroxymethyl-5-norbornene (either the endo isomer or the exo isomer or mixture thereof). Still further, allyl alcohol, methallyl alcohol, crotyl alcohol and unsaturated fatty alcohols corresponding to drying oil fatty acids may be used.

It is essential, as previously indicated, to employ both resinous and monomeric hydroxy functional materials capable of taking part in addition polymerization so that both of these are incorporated into the interpolymer which is produced. Sufficient of each of these materials should be used such that at least 15% of the hydroxy functionality in the interpolymer is provided by each of the different types of hydroxy functional material, preferably at least 25% of the total hydroxy functionality being supplied by each of the two types of materials.

The third essential component of the interpolymer is from 50-95% by weight, preferably from 60-90% by weight of monoethylenically unsaturated monomer substantially devoid of material reactive with the hydroxy group. Also, and since flexible and impact resistant coatings capable of withstanding exterior exposure are of particular importance, any proportion of styrene, vinyl toluene and methyl methacrylate must be limited as taught hereinafter. Preferably, the monoethylenic monomers which are used contain the $CH_2=C<$ group.

Since enhanced flexibility is at a premium it is particularly preferred that the interpolymer include at least 20% by weight, and preferably at least 40% by weight of monoethylenically unsaturated ester in which the terminal carbon chain is of sufficient length to provide extensive internal plasticization. This is most desirably achieved using acrylate esters with alkanols containing at least 2 carbon atoms, and preferably with a proportion of acrylate ester in which the terminal carbon chain contains at least 6 carbon atoms. Methacrylate esters containing 3 or more carbon atoms in the terminal carbon chain may also be used. Maleate, fumarate, crotonate esters and diesters with alkanols containing at least 2 carbon atoms are also usable, such as dibutyl maleate and dibutyl fumarate.

While monomers such as styrene, vinyl toluene, and methyl methacrylate are desirably present in the interpolymer, the proportion thereof should be less than 40% and preferably should be less than 30%.

Other monoethylenically unsaturated monomers which may be present are illustrated by acrylonitrile, vinyl acetate, vinyl stearate, butene-1, n-butyl vinyl ether, etc.

As will be evident from the foregoing, the present invention contemplates thermoplastic hydroxy-functional interpolymers which, aside from the hydroxy functionality, are largely devoid of other reactive groups so as to provide a thermoplastic polymer which does not significantly thermoset in the absence of an extraneous crosslinking agent which, pursuant to the invention, preferably comprises an aminoplast resin. Nonetheless, small amounts of other reactive monomers, up to about 3% by weight, may desirably be present primarily for catalytic purposes. In this connection, and as a feature of the invention, a monoethylenically unsaturated carboxylic acid amide, particularly an acrylamide such as acrylamide or methacrylamide, is particularly preferred. These amides in amounts of from 0.5 to about 3% do not provide a self-curing polymer but they do function to improve adhesion and to lower curing temperature when the extraneous curing agent is present. Also, it is easier to avoid the formation of bothersome polymer fragments during addition polymerization and this is helpful.

Similarly, a small amount of a monoethylenically unsaturated acid may be used such as acrylic, methacrylic, or crotonic acids, again the purpose being catalysis, improved compatibility and better adhesion, and not the production of a self-curing interpolymer.

It is particularly stressed that proportions of reactive monomers in excess of 3%, e.g., about 4% are detrimental. In particular, they reduce the desired flexibility and such excessive proportions should not be present.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is to well known to require elucidation except to point out that typical catalysts are illustrated in the examples.

The particular nature of the organic solvent used for the solution copolymerization or for the solvent solution application of the interploymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

Chain terminating agents, such as mercaptans, may be used to exert their known effect of lowered average molecular weight.

The heat-hardening cure of thermoplastic hydroxy-functional polymers using extraneous curing agents is old and well known being well illustrated, for example, in U.S. Patents 2,512,726 and 2,897,174. Thus, and in the discussion which follows it will be understood that the selection of the curing agent is not itself regarded as inventive. Indeed, one may broadly use polyepoxides, aminoplast resins, polyisocyanates, etc. Nonetheless, the invention preferably uses aminoplast resins, alone or in combination with polyepoxides.

These aminoplast resins are preferably heat-hardening, solvent-soluble condensation products of a triazine with excess formaldehyde. As is well known, solvent solubility is usually provided by etherifying the aminoplast resin with a $C_3$-$C_8$ alcohol, preferably butanol.

While the broad class of heat-hardening solvent-soluble aminoplast resins is a well known class, the invention will be illustrated by hexamethoxymethyl melamine. Another typical solvent-soluble aminoplast resin which may be used is a 60% resin solids solution of benzoguanamine-formaldehyde resin in a 50/50 weight ratio mixture of butanol/xylol. The benzoguanamine-formaldehyde resin is a condensation product of 4 mols of formaldehyde with 1 mol of benzoguanamine in the presence of excess butanol and an acid catalyst to provide a heat-hardening resin etherified with butanol to provide solvent solubility. The benzoguanamine-formaldehyde resin solution has a viscosity on the Gardner-Holdt scale at 25° C. of G–K.

Other typical aminoplast resins are illustrated by butylated melamine-formaldehyde condensates and by a urea-formaldehyde condensate, in each case utilizing excess formaldehyde to insure heat-hardening characteristics.

As previously indicated, the hydroxy-functional solvent-soluble interpolymers of the invention are primarily intended to be used in solution together with a resinous curing agent which is in solution therewith.

Various combinations of hydroxyl-polyester interpolymers with melamine and epoxide have produced enamels with a wide range of physical properties and resistance characteristics. Higher levels of aminoplast resin result in enamels with greater hardness and chemical resistance, considerable flexibility being retained. Incorporation of some di-epoxide resin resutls in greater flexibility and improved corrosion resistance. The compatibility properties and latitude of physical and chemical properties offered by the interpolymers of the invention gives the formulator many excellent possibilities in designing the end products. The resulting thermoset films possess excellent physical and chemical properties and are particularly useful as finishes for aluminum and steel.

Within the above framework, the preferred solution coating composition is a blend of two or three components in which from 60–95% of the blended resins are constituted by the hydroxy-functional interpolymers of the invention and from 5–30% of the blended resins are solvent-soluble, heat-reactive aminoplast resin. More preferably, the blend does not include more than 90% of the hydroxy interpolymer and 3–20% by weight of the mixture of resins is a polyepoxide.

Numerous polyepoxides are known for use in solution coating compositions and any of these may be used. These frequently are polyglycidyl ethers of a polyhydric compound which may be aliphatic or aromatic such as glycerin or a bisphenol, such as bisphenol A. The preferred polyepoxides have a 1,2-epoxy equivalency in excess of 1.4.

The compositions of the invention are cured by baking, typical baking conditions ranging from 300° F. to 550° F. for a period of time of from 30 minutes to 30 seconds. An important feature of the invention is the capacity for rapid cure. Indeed, the cure is even more rapid than is conventionally obtained for thermosetting systems based on methylolated acrylamide. At the same time, extensive resistance to overcuring is obtained.

As will be evident, the coating composition can be pigmented or clear and dyes, flow control agents, waxes and various other components may be included as will be evident to those skilled in the art.

In the examples which follow, all parts are by weight unless otherwise indicated.

EXAMPLE I

Preparation of hydroxyl-terminated polyester

| | Parts by weight |
|---|---|
| Trimethylol propane | 2700 |
| Isophthalic acid | 940 |
| Xylol | 30 |
| 2-ethoxy ethanol acetate | 30 |

Charge into reactor and heat to 430° F. using nitrogen sparge. Hold for acid value of 60–70.

| Add: | Parts by weight |
|---|---|
| Adipic acid | 730 |
| Isophthalic acid | 600 |
| Maleic anhydride | 60 |
| Xylol | 20 |
| 2-ethoxy ethanol acetate | 20 |

Reheat to 420° F. Hold for acid value of 10–12.

Add solvent, 2-ethoxy ethanol acetate _____ 2700

Final characteristics:
 Solids (percent) _____ 60.1
 Viscosity (Gardner) _____ U–V
 Color _____ 2
 Acid value _____ 11.9
 Hydroxy value (.68 equivalent of hydroxy/100 grams of resin solids) _____ 38.1

EXAMPLE II

Monomer composition (solids basis)

| | Parts by weight |
|---|---|
| Hydroxy polyester of Example I | 100 |
| 2-hydroxyethyl acrylate | 100 |
| Ethyl acrylate | 540 |
| Styrene | 50 |
| Methyl methacrylate | 200 |
| Glacial methacrylic acid | 20 |

Procedure of preparation

| | Parts by weight |
|---|---|
| 2-ethoxy ethanol acetate | 350 |
| Butanol | 100 |
| Hydroxy polyester of Example I (60% solids) | 170 |

Charge into reactor equipped with an agitator, reflux condenser, thermometer nitrogen inlet tube and separatory addition funnel. Heat to 250° F.

| | Parts by weight |
|---|---|
| Ethyl acrylate | 540 |
| Styrene | 50 |
| 2-hydroxyethyl acrylate | 100 |
| Glacial methacrylic acid | 20 |
| Methyl methacrylate | 200 |
| Di-tertiary butyl peroxide | 10 |

Premix monomers and add to reactor over 2 hour period at 250–260° F. Hold for 2 hours at 250–260° F.

Tertiary butyl perbenzoate _____ 3

Add additional catalyst to complete monomer conversion. Hold for 2 hours.

Tertiary butyl perbenzoate _____ 2

Add catalyst. Hold for 2 hours.

| | Parts by weight |
|---|---|
| Aromatic hydrocarbon solvent (boiling range of 145–195° C.) | 200 |
| Butanol | 300 |

Add solvents. Cool to 180° F. and filter.

Final characteristics:
- Solids (percent) _____ 50.5
- Viscosity (Gardner) _____ Z
- Color (Gardner) _____ 1

In the present example, 0.68 equivalent of hydroxy are derived from the polyester and 0.86 equivalent from the acrylate monomer corresponding to 44.2% hydroxy derived from the polyester and 55.8% derived from the acrylate monomer.

EXAMPLE III

Monomer charge composition

| | Parts by weight |
|---|---|
| Ethyl acrylate | 520 |
| Styrene | 50 |
| Hydroxy polyester of Example I | 150 |
| 2-hydroxyethyl acrylate | 90 |
| Glacial methacrylic acid | 20 |
| Methyl methacrylate | 170 |

Procedure of preparation

| | Parts by weight |
|---|---|
| 2-butoxy ethanol | 350 |
| Hydroxy polyester of Example I | 250 |

Charge into recator equipped with an agitator, thermometer, reflux condenser, separatory addition funnel, and nitrogen inlet tube. Heat to 250° F.

| | Parts by weight |
|---|---|
| Ethyl acrylate | 520 |
| Styrene | 50 |
| 2-hydroxyethyl acrylate | 90 |
| Methyl methacrylate | 170 |
| Glacial methacrylic acid | 20 |
| Di-tertiary butyl peroxide | 10 |

Premix monomers and add over 2 hours to reactor. Hold for one hour.

Tertiary butyl perbenzoate _____ 3

Add additional catalyst to complete monomer conversion. Hold for 2 hours at 260° F.

Tertiary butyl perbenzoate _____ 2

Add catalyst. Hold for 2 hours.

Butanol _____ 300

| | Parts by weight |
|---|---|
| Aromatic hydrocarbon solvent (boiling range of 145–195° C.) | 200 |

Add solvents. Cool to 180° F. and filter.

Final characteristics:
- Solids (percent) _____ 52.1
- Viscosity (Gardner) _____ W
- Color (Gardner) _____ 1

In the present example, 1.02 equivalents of hydroxy are derived from the polyester and 0.78 equivalent from the acrylate monomer corresponding to 56.7% hydroxy derived from the polyester and 43.3% derived from the acrylate monomer.

EXAMPLE IV

Monomer charge composition (solids basis)

| | Parts by weight |
|---|---|
| Ethyl acrylate | 570 |
| Styrene | 50 |
| Hydroxy polyester of Example I | 50 |
| 2-hydroxyethyl acrylate | 100 |
| Glacial methacrylic acid | 20 |
| Methyl methacrylate | 210 |

Procedure of preparation

| | Parts by weight |
|---|---|
| 2-ethoxy ethanol acetate | 350 |
| Butanol | 100 |
| Hydroxy polyester of Example I (60% solids) | 85 |

Charge into reactor equipped with an agitator, reflux condenser, nitrogen inlet tube, thermometer, and a separatory addition funnel. Heat to 250° F.

| | Parts by weight |
|---|---|
| Ethyl acrylate | 570 |
| Styrene | 50 |
| 2-hydroxyethyl acrylate | 100 |
| Glacial methacrylic acid | 20 |
| Methyl methacrylate | 210 |
| Di-tertiary butyl peroxide | 10 |

Premix monomers and add over 2 hours at 250–260° F. Hold for 2 hours.

Tertiary butyl perbenzoate _____ 3

Add additional catalyst. Hold for one hour.

Tertiary butyl perbenzoate _____ 2

Add catalyst. Hold for 2 hours at 250–260° F.

| | Parts by weight |
|---|---|
| Aromatic hydrocarbon solvent (boiling range of 145–195° C.) | 200 |

Add solvent. Cool to 180° F. and filter.

Final characteristics:

| | |
|---|---|
| Solids (percent) | 49 |
| Viscosity (Gardner) | $Z_2-Z_3$ |
| Color | 1 |

The copolymer of Example II was evaluated in high gloss white enamels.

The nonvolatile resin composition was:

| | Percent |
|---|---|
| Acrylic-polyester copolymer of Example II | 90 |
| Hexamethoxy methyl melamine | 10 |

White enamel composition was:

| | |
|---|---|
| Non-volatile resin (9 parts acrylic to 1 part melamine) | 32 |
| Titanium dioxide | 28 |

All drawdowns were made with a #38 wound-wire rod (.9–1.0 mil dry film) on sheets aluminum and baked for specified times in a gas oven set at 475° F.

The above enamel was evaluated against a standard commercial methylolated acrylamide interpolymer.

The results of this comparison are as follows:

On undercuring, e.g., exposure in a gas oven at 475° F. for from 30–45 seconds, the reverse impact resistance of the resins of the invention was considerably superior, passing 40 inch/pounds of reverse impact whereas the commercial standard correspondingly undercured showed fractures at 10 inch/pounds of reverse impact.

At standard cure times of from 60–75 seconds, the two compositions were fully comparable with one another, but the product of Example II was slightly superior in its capacity to resist dry heat. Also, the composition of Example II showed no yellowing whatever when the panel baked for 60 seconds was given a 100% overbake.

This capacity to cure fully despite an extremely fast curing cycle, to provide good cures at normal curing cycles and to withstand extensive overbaking, is of considerable importance in practical commercial operations. If the polyester resin component were omitted from the interpolymer of Example II, then the product would lose much of its flexibility. Correspondingly, and when the conventional methylolated acrylamide interpolymers are formulated for maximum flexibility, they tend to become more sensitive to failure because of undercuring which does not occur in the invention.

EXAMPLE V

An oil modified unsaturated polyurethane is prepared as follows, using an 11% excess of hydroxyl with respect to isocyanate:

| | Parts by weight |
|---|---|
| Coconut oil | 1635 |
| Polypropylene glycol polyether (molecular weight 1025) | 175 |
| Glycerine | 235 |
| 4% calcium naphthenate dried | 5 |

Charge the above ingredients to a reactor and heat to 480° F. Hold for 1 hour using nitrogen sparge. Cool to 250° F. and add:

| | Parts by weight |
|---|---|
| Trimethylol propane monoallyl ether | 160 |

Cool to 120° F.

| | |
|---|---|
| Toluene diisocyanate | 780 |

Premix in separate container and add over 1 hour period.

| | Parts by weight |
|---|---|
| Aromatic hydrocarbon solvent (boiling range of 145–195° C.) | 1880 |

Allow temperature to go to 170° F. Hold for 2–3 hours, then heat to 280–290° F. and hold for Gardner viscosity of Z at 60% solids.

The resulting polyurethane resin has the following final characteristics:

| | |
|---|---|
| Solids (percent) | 60.1 |
| Viscosity (Gardner) | Z |

EXAMPLE VI

Examples II–IV are repeated utilizing a corresponding weight proportion of the hydroxy-terminated polyurethane of Example V in place of the hydroxy polyester of Example I. Approximately corresponding results are obtained. The polyurethane tends to provide somewhat better flexibility and adhesion.

EXAMPLE VII

Example II is repeated, utilizing a corresponding weight proportion of acrylamide in place of the glacial methacrylic acid of Example II. Approximately corresponding results are obtained.

EXAMPLE VIII

Preparation of hydroxy terminated polyester.—Part A

| | Parts by weight |
|---|---|
| Trimethylol propane | 2700 |
| Isophthalic acid | 940 |
| Xylol | 30 |
| 2-ethoxy ethanol acetate | 30 |

Charge into reactor equipped with agitator, thermometer, Dean-Stark trap, nitrogen inlet tube, and a reflux condenser. Heat to 430° F. and hold for acid value of 65–75.

| | Parts by weight |
|---|---|
| Adipic acid | 730 |
| Isophthalic acid | 600 |
| Maleic anhydride | 60 |
| Xylol | 20 |
| 2-ethoxy ethanol acetate | 20 |
| 2-ethoxy ethanol acetate | 2700 |

Reheat to 420° F. and hold for acid value of 10 to 12. Add 2-ethoxy ethanol acetate to 60% solids (Gardner viscosity: U–V). Polyester contains .68 equivalents OH per 100 grams of resin solids. Hydroxy value of 38.1, viscosity: 8.0 poises.

EXAMPLE IX

Preparation of unsaturated hydroxy terminated urethane

| | Parts by weight |
|---|---|
| Hydroxy terminated polyester (60% solids) Example VIII | 1500 |

Set Dean-Stark trap with xylol. Distill off water. Remove trap and cool to 150 °F.

| | Parts by weight |
|---|---|
| Dicyclohexylmethane-4, -4-diisocyanate | 78 |

Add to the flask. Hold for $Z_2-Z_3$ viscosity at 190° F.

| | Parts by weight |
|---|---|
| Dibutyl tin dilaurate catalyst | 0.5 |
| 2-ethoxy ethanol acetate | 340 |
| Butyl alcohol | 20 |

Add. Cool to 80° F.

| | Parts by weight |
|---|---|
| Hydroxy equivalents of polyester | 6.12 |
| Isocyanate equivalents used | 0.59 |
| Hydroxy equivalents (unreacted) | 5.53 |

NOTE.—After reaction with isocyanate viscosity of polyester increased more than 5 times.

Final characteristics of unsaturated urethane resin:

| | |
|---|---|
| Solids (percent) | 50.7 |
| Viscosity (Gardner) | Q–R |
| Color (Gardner) | 2 |

EXAMPLE X

Preparation of acrylic hydroxy interpolymer

| | Parts by weight |
|---|---|
| 2-butoxy ethanol | 350 |
| Unsaturated urethane of Example IX | 200 |

Charge into reactor. Heat to 250° F.

| | Parts by weight |
|---|---|
| Ethyl acrylate | 540 |
| Styrene | 50 |
| 2-hydroxyethyl acrylate | 100 |
| Glacial methacrylic acid | 20 |
| Methyl-methacrylate | 190 |
| Di-tertiary-butyl peroxide | 10 |

Premix and add over 2 hours to reactor at 260° F.

Tertiary butyl perbenzoate _____ 3

Add. Hold for 2 hours.

Tertiary butyl perbenzoate _____ 2

Add. Hold for 2 hours.

Butyl alcohol _____ 300
Aromatic hydrocarbon solvent (boiling range of 145–195° C.) _____ 200

Add. Cool to 180° F. Filter.

Final characteristics:
| | |
|---|---|
| Solids (percent) | 49.4 |
| Viscosity (Gardner) | X–Y |
| Color (Gardner) | 1–2 |

EXAMPLE XI

Evaluation of urethane-hydroxy polymer in high gloss coil coating

The copolymer of Example X was evaluated in high gloss white enamels.

The nonvolatile resin composition was:

| | Percent |
|---|---|
| Acrylic urethane copolymer of Example X | 90 |
| Butylated heat-hardening melamine-formaldehyde condensate | 10 |

White enamel composition was:

| | Percent |
|---|---|
| Nonvolatile resin (9 parts acrylic to 1 part melamine) | 32 |
| Titanium dioxide | 28 |

The drawdowns were made with a #38 wound-wire rod (.9–1.0 mil dry film) on .019 aluminum and baked 90 seconds in a gas oven set at 475° F. The coating had the following properties:

| | |
|---|---|
| Gloss (60 photovolt) | 92. |
| Pencil hardness | H. |
| Reverse impact | Pass 40 inch/lbs. |
| Toluol resistance | Very good. |
| Adhesion to metal | Excellent. |

The hydroxy urethane melamine polymer had very good properties as demonstrated by excellent gloss, solvent resistance, and film hardness, in combination with very considerable reverse impact resistance.

The invention is defined in the claims which follow.

I claim:

1. An hydroxy-functional organic solvent-soluble interpolymer consisting essentially of the addition polymerization product of:
   (A) 5–15% by weight of polyethylenically unsaturated hydroxy-functional polyester or polyurethane condensation resin;
   (B) 2–20% by weight of non-nitrogenous aliphatic monoethylenically unsaturated hydroxy-functional monomer; and
   (C) 50–95% percent by weight of monoethylenically unsaturated monomer substantially devoid of material reactive with the hydroxy group, any proportion of monomer selected from the group consisting of styrene, vinyl toluene, and methyl methacrylate amounting to not more than 40% by weight of the interpolymer;
   said components (A) and (B) each providing at least 15% of the total hydroxy functionality in the interpolymer.

2. An hydroxy-functional interpolymer as recited in claim 1 in which said polyethylenically unsaturated hydroxy-functional resin is a resinous polyester having an hydroxy number of from 10–300 and a viscosity in n-butanol at 80% solids in the range of from C to $Z_6$ measured on the Gardner-Holdt scale at 25° C.

3. An hydroxy-functional interpolymer as recited in claim 2 in which said polyester contains about 0.005 to 0.40 gram mol of ethylenically unsaturated component per 100 grams of polyester and the unsaturation of said unsaturated polyester is selected from the group consisting of alpha,beta-unsaturation; beta,gamma-unsaturation, and conjugated unsaturation.

4. An hydroxy-functional interpolymer as recited in claim 1 in which said component (C) consists of monomer containing a single $CH_2{=}C{<}$ group.

5. An hydroxy-functional interpolymer as recited in claim 4 in which said interpolymer includes 0.5 to 3% by weight of monoethylenically unsaturated carboxylic acid or carboxylic acid amide.

6. An hydroxy-functional interpolymer as recited in claim 1 in which said polyethylenically unsaturated hydroxy functional resin is a resinous polyurethane having an hydroxy number of from 10–300 and a viscosity in n-butanol at 80% solids in the range of from C to $Z_6$ measured on the Gardner-Holdt scale at 25° C.

7. An hydroxy-functional interpolymer as recited in claim 6 in which said unsaturated polyurethane is the reaction product of components comprising organic diisocyanate and hydroxy components comprising ethylenically unsaturated compound containing the hydroxy group, saturated aliphatic diol, and saturated aliphatic polyhydroxy compound containing at least three hydroxyl groups.

8. An hydroxy-functional interpolymer as recited in claim 7 in which said diisocyanate is present in an amount of from 10–30% by weight, based on the weight of the polyurethane and in which said hydroxy components include at least 10% by weight, based on the total weight of hydroxy components, of polyether having a molecular weight of from 300 to about 7000.

9. An hydroxy-functional interpolymer as recited in claim 8 in which the stoichiometric balance of hydroxy groups to isocyanate group in said polyurethane is within the range of from .05:1 to 2.5:1 and said polyurethane has an unsaturation indicated by an iodine number of from 25–400.

10. An hydroxy-functional interpolymer as recited in claim 1 in which said component (A) has an hydroxy number of from 10—300 and a viscosity in n-butanol at 80% solids in the range of from D to W measured on the Gardner-Holdt scale at 25° C.

11. An hydroxy-functional interpolymer as recited in claim 1 in which said interpolymer includes at least 20% by weight of monoethylenically unsaturated ester having a terminal carbon chain of sufficient length to provide extensive internal plasticization.

12. An hydroxy-functional organic solvent-soluble interpolymer consisting essentially of the addition polymerization product of:
   (A) 3–25% by weight of oil-free polyethylenically unsaturated hydroxy-functional resin selected from the group consisting of polyester resins and polyurethane resins having an hydroxy number of from 10–300 and a viscosity in n-butanol at 80% solids in the range of from C–Z$_6$ measured on the Gardner-Holdt scale at 25° C.;

(B) 2–20% by weight of non-nitrogenous aliphatic monoethylenically unsaturated hydroxy-functional monomer; and (C) 50–95% by weight of monoethylenically unsaturated monomer substantially devoid of material reactive with the hydroxy group, said monomer comprising at least 20% by weight of the interpolymer of acrylate ester containing at least two carbon atoms or methacrylate ester containing at least three carbon atoms in the terminal carbon chain, any proportion of monomer selected from the group consisting of styrene, vinyl toluene, and methyl methacrylate amounting to not more than 30% by weight of the interpolymer;

said components (A) and (B) each providing at least 25% of the total hydroxy functionality in the interpolymer.

13. An hydroxy-functional interpolymer as recited in claim 12 in which said component (B) is an hydroxy alkyl acrylate or methacrylate.

14. Thermosetting coating composition comprising an organic solvent having dissolved therein;

(I) An hydroxy-functional organic solvent-soluble interpolymer consisting essentially of the addition polymerization product of:

(A) 5–15% by weight of polyethylenically unsaturated hydroxy-functional polyester or polyurethane condensation resin;

(B) 2–20% by weight of non-nitrogenous aliphatic monoethylenically unsaturated hydroxy-functional monomer; and (C) 50–95% by weight of monoethylenically unsaturated monomer substantially devoid of material reactive with the hydroxy group, any proportion of monomer selected from the group consisting of styrene, vinyl toluene, and methyl methacrylate amounting to not more than 40% by weight of the interpolymer;

said components (A) and (B) each providing at least 15% of the total hydroxy functionality in the interpolymer; and (II) A curing agent for said interpolymer.

15. A thermosetting coating composition as recited in claim 14 in which said curing agent comprises aminoplast resin.

16. A thermosetting coating composition as recited in claim 14 in which said curing agent comprises a polyepoxide.

17. A thermosetting coating composition as recited in claim 14 in which 60–95 parts of said interpolymer are combined with from 5–30 parts of organic solvent-soluble, heat-reactive aminoplast resin and 3–20 parts of a resinous polyepoxide.

References Cited

UNITED STATES PATENTS

| | | | |
|---|---|---|---|
| 2,852,487 | 9/1958 | Maker | 260—872 |
| 2,897,174 | 7/1959 | Chapin et al. | 260—853 |
| 3,007,894 | 11/1961 | Bunge et al. | 260—22 |
| 3,287,292 | 11/1966 | Dalibor | 260—22 |
| 3,287,293 | 11/1966 | Dalibor | 260—22 |

FOREIGN PATENTS

| | | |
|---|---|---|
| 540,169 | 10/1941 | Great Britain. |
| 985,770 | 3/1965 | Great Britain. |
| 995,241 | 6/1965 | Great Britain. |

HOSEA E. TAYLOR, JR., Primary Examiner

R. W. GRIFFIN, Assistant Examiner

U.S. Cl. X.R.

117—132, 134, 161, 167; 260—21, 22, 23, 32.8, 33.4, 33.6, 40, 835, 850, 859, 872